United States Patent [19]

Otty

[11] 4,370,188

[45] Jan. 25, 1983

[54] METHOD AND APPARATUS FOR INSULATING COILS FOR ROTARY ELECTRIC MACHINES

[76] Inventor: Malcolm Otty, Westering, Mill Hay Rd., Caldy, Merseyside, England

[21] Appl. No.: 281,724

[22] Filed: Jul. 9, 1981

[30] Foreign Application Priority Data

Jul. 9, 1980 [GB] United Kingdom ............... 8022523

[51] Int. Cl.³ ................... B29C 15/00; B29C 27/26; B32B 31/20
[52] U.S. Cl. ................................... 156/245; 29/596; 156/185; 156/194; 156/195; 156/312; 156/500; 156/583.1; 156/583.91; 264/40.5; 264/137; 264/258; 264/272.19; 264/DIG. 46; 425/157; 425/383; 425/406; 425/446
[58] Field of Search ..................... 156/47, 48, 53, 172, 156/185, 583.1, 583.7, 583.9, 583.91, 580, 312, 242, 245, 500; 264/320, 248, 258, 272.19, 137, DIG. 46, 40.5, 40.6; 100/93 P, 295, 237; 29/595, 605; 425/143, 149, 233, 383, 406, 446, 157

[56] References Cited

U.S. PATENT DOCUMENTS

| | | | |
|---|---|---|---|
| 2,400,008 | 5/1946 | Korte | 29/605 |
| 2,601,243 | 6/1952 | Botts et al. | 156/185 |
| 2,656,290 | 10/1953 | Berberich et al. | 29/605 |
| 2,675,421 | 5/1954 | Dexter | 264/258 |
| 2,783,171 | 2/1957 | Thiessen | 156/185 |
| 2,922,734 | 1/1960 | Kohn et al. | 264/272.19 |
| 2,979,432 | 4/1961 | Thiessen | 156/53 |
| 3,232,544 | 2/1966 | Caldwell | 156/443 |

*Primary Examiner*—Willard E. Hoag
*Attorney, Agent, or Firm*—Oblon, Fisher, Spivak, McClelland & Maier

[57] ABSTRACT

The wrapped insulation on the straight parallel sections of coils for larger rotary electric machines is treated under heat and pressure in a preferably double-sided coil press in which pressure is applied first to the center of the heated sections then also to the outer parts thereof to enable excess resin impregnating the insulation to flow away from the center parts and achieve a more uniformly and accurately dimensioned coil.

10 Claims, 4 Drawing Figures

METHOD AND APPARATUS FOR INSULATING COILS FOR ROTARY ELECTRIC MACHINES

This invention relates to insulating coils for larger rotary electric machines. Such coils comprise loops of copper strip with straight parallel sections that fit into angularly spaced rotor or stator slots. The copper is wrapped with an insulating tape impregnated with resin that is curved by heating under pressure in a mould that shapes the insulation of the straight sections to be a snug fit in the slots. The mould comprises elongate static and moving press members that co-operate to press the insulation. The operation is referred to as "pressing".

In a typical pressing operation, the coil is laid on the static press members—the arrangement being preferably double-sided so as to press both straight sections of the coil at the same time—and the moving press member is brought down to meet the coil. Heat is applied— one or both the press members being provided with electric resistance heating elements—to soften the resin, which may either have been included in the insulating tape or added after the wrapping by immersing the coil in a resin bath—preferably after an evacuation stage and preferably under pressure. Then pressure is applied and held while the temperature is reduced until the resin sets.

Hitherto, pressure has been applied uniformly along the entire length of each straight section of the coil, the moving press member being carried on pneumatic or hydraulic rams which serve to move it to meet the static press member and subsequently to apply pressure.

The present invention results in a more uniform distribution of resin along the length of the straight coil sections and more accurate and uniform dimensioning of the coil cross section as a result.

The invention comprises a method of pressing the straight parallel sections of coils for larger rotary electric machines, in which pressure is first applied to the central parts of the heated coil sections, then pressure is also applied to the outer parts thereof.

The pressure may be applied by inner and outer rams of which the inner rams are actuated to apply pressure before the outer rams. The inner rams may carry elongate moving press members and move them into contact with the straight coil sections carried on co-operating static press members, the press members extending the whole length of said straight sections and the outer rams afterwards engaging the moving press members to apply pressure therethrough to the outer sections of the coils.

The invention also comprises coil pressing apparatus for applying heat and pressure to the wrapped insulation of the straight parallel sections of coils for larger rotary electric machines, comprising pressure applying means operable to apply pressure first to the central parts of the said sections and then also to the outer parts thereof.

Preferably the apparatus is double-sided for pressing both straight sections at the same time and in which the straight sections are held in the same horizontal plane during the pressing.

The apparatus may comrise static press members in which the straight coil sections rest and moving press members co-operating with said static members and carried on inner rams which serve to bring the moving press members together with the static members to press the coils, and outer rams that subsequently engage the outer parts of the moving press members to apply pressure thereto against the static press members.

At least said moving press members may be heated, as by having electric resistance heating elements.

The apparatus is preferably adapted to press different sizes and configurations of coil. The press members may be adjustable to take different widths of coil, and tiltable to take different relative inclinations of the straight sections (to fit slots of different angular spacing). To accommodate the press for different lengths of straight sections, it is preferably arranged that the coil rests in the static press member with its ends, which project out of the plane containing the straight sections, pointing downwardly, and the moving press member, which comes downwardly towards the static press member, can then be "universal", that is to say, it can be used for any size of coil. The static press members only need be specially made—by machinery from mild steel bar—to the correct shape and size for each different coil size and configuration.

The moving press member is connected to the central ram or inner rams of a set of three or four on each side of the press. The outer rams may then be adjustable to apply pressure between the inner rams and the ends of the coil sections.

One embodiment of coil pressing apparatus according to the invention will now be described with reference to the accompanying drawings, in which.

Figure 1:
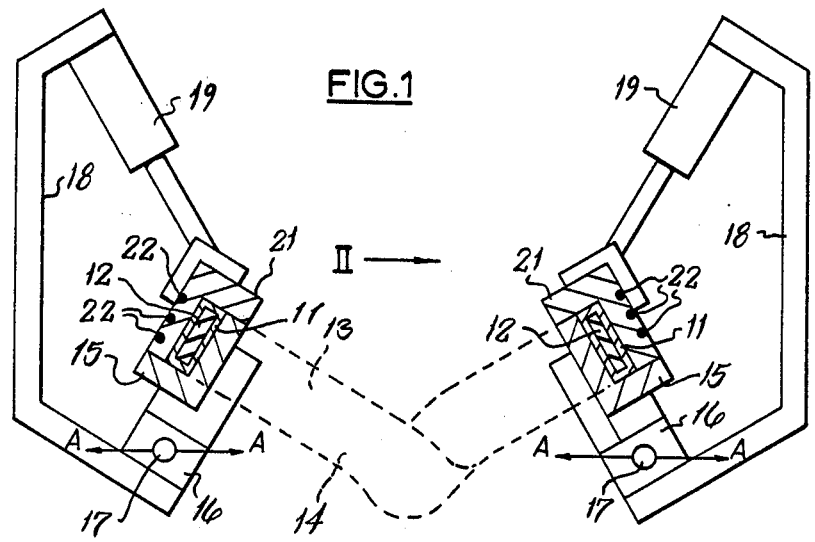
FIG. 1 is a sectional side elevation of a double-sided coil press.

The coil pressing apparatus illustrated in FIGS. 1 to 4 is for applying heat and pressure to the wrapped insulation 11 of the straight parallel sections 12 of a coil 13 for a larger rotary electric machine. Such coils are of generally rectangular or hexagonal shape the straight parallel sections 12 being connected by end section 14 (dashed lines in FIG. 1) that project out of the plane containing the straight sections 12 because those straight sections have been relatively inclined to fit angularly spaced rotor or stator slots of the electric machine. The size and configuration of the coils differ from machine to machine and it is desirable that a coil press be adaptable to press different sizes and configurations of coil, of which the smallest will have straight sections about 20 cm long, spaced apart by about 15 cm, and larger ones will have straight sections 1 or 2 meters long, correspondingly widely spaced.

The press is doubled-sided to press both straight sections 12 at the same time not only because production is doubled as compared to single-sided presses but also to hold the coil in a stress-free condition while the resin in the wrapping is hot and fluid. Single-sided presses in which the coil is cantilevered while one side is pressed at a time have the disadvantage that the copper becomes displaced under the weight of the unsupported part of the coil and the insulation is uneven, which requires more insulation for safe operation, reducing the efficiency of the electric machine.

The press comprises lower, static press members 15 carried on supports 16 that are relatively separable in the direction of arrows A of FIG. 1 and also relatively tiltable about axes 17 to accommodate different widths and angular inclinations of coil. Also carried on the supports 16 are upstanding arms 18 holding downwardly pointing pneumatic or hydraulic rams 19, four on each side of the press.

The inner two rams 19 on each side have attached thereto a moving press member 21 that has an electric resistance heating element 22 running along its length. The press member 21 is simply a length of L-section steel, and is long enough to accommodate the longest coil desired to be pressed in the apparatus. The static press member 15 will be specially made for each different size of coil, being just long enough to support the straight sections 12.

Figure 2:
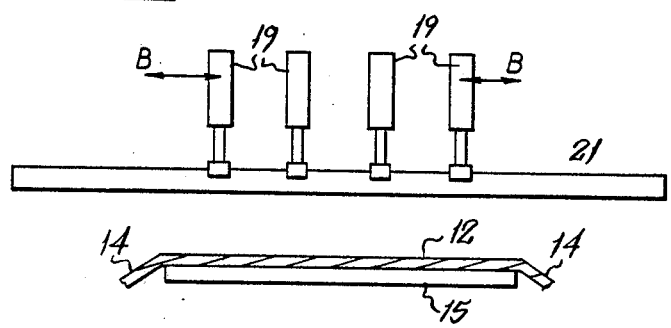
FIG. 2 is a view in the direction of arrow II of FIG. 1 showing the apparatus in a first position.
Figure 3:
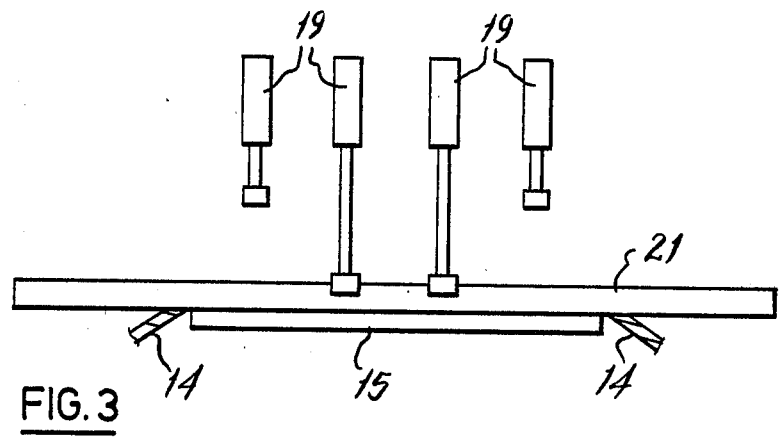
FIG. 3 is a view like FIG. 2 showing a second position.
Figure 4:
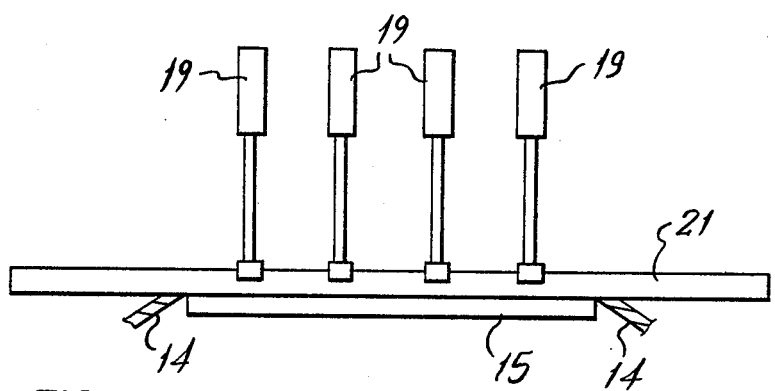
FIG. 4 is a view like FIG. 2 showing a third position.

In operation, a coil is placed with its straight sections 12 in the static press members 15 and the inner rams 19 on each side operated to bring the moving press members 21 down on to the static press members 15—moving from the position shown in FIG. 2 to that shown in FIG. 3. The resin-impregnated insulation is heated by the members 21 so that it softens and can flow. The inner rams 19 now apply pressure, while the outer rams 19 are still disengaged—FIG. 3. This has the effect of forcing the excess resin out from the middle of the straight sections 12 towards the ends thereof. Subsequently, the outer rams 19 are also brought down to apply pressure to the moving press member 21 to press the outer parts of the straight sections 12—this is the position shown in FIG. 4. The temperature is reduced before the rams 19 are all raised to release the pressed coil.

The outer rams 19 may be movable in the direction of arrows B on FIG. 2 so that they can apply pressure to different parts of the members 21 to accommodate different lengths of coil. For long coils, they may be supplemented by additional rams.

Preferably, the temperature and pressure cycles are automatically controlled according to a pre-determined specification.

What we claim is:

1. In a method for applying and curing wrapped resin impregnated insulation about a coil for a rotary electric machine, said coil having spaced parallel straight side portions, using press apparatus having a plurality of pressure applying means for each of said side portions including inner pressure applying means remote from ends of said coil and outer pressure applying means disposed on either side of said inner pressure applying means along said straight side portions, the improvement comprising:
   applying pressure first by said inner pressure applying means and thereafter applying pressure by said outer pressure applying means, wherein excess resin is caused to flow toward said end portions of said coil from said straight side portions.

2. A method according to claim 1 including two of said straight side portions, in which both straight portions are pressed at the same time.

3. A method according to claim 1 or 2, in which said pressure applying means comprise inner and outer rams of which the inner rams are actuated to apply pressure before the outer rams.

4. A method according to claim 3, in which the inner rams carry elongate moving press members and move said moving press members into contact with the straight coil portions carried on cooperating static press members, said static and moving press members extending the whole length of said straight portions and the outer rams afterwards engaging said moving press members to apply pressure therethrough to outer sections of the coils.

5. A method according to claim 4 in which heat is applied to the coil by heating said moving press members.

6. In apparatus for applying heat and pressure for curing resin-impregnated insulation about a coil for a rotary electric machine each said coil having parallel straight side portions, said apparatus including plural pressure applying means for each of said side portions and including both outer pressure applying means which in use are positioned near ends of said coil and inner pressure applying means positioned between said outer pressure applying means, the improvement comprising:
   sequential control means to sequence operation of said inner and outer pressure applying means, with said inner means being first actuated and thereafter applying pressure with said outer pressure applying means.

7. Coil pressing apparatus according to claim 6 including two of said straight side portions, said apparatus being double-sided for pressing both straight portions at the same time.

8. Coil pressing apparatus according to claim 7, in which said straight portions are held in the same horizontal plane during the pressing.

9. Coil pressing apparatus according to one of claims 8 or 6, in which said pressure applying means include static press members in which said straight portions rest, and moving press members co-operating with said static members, said moving press members being carried on inner rams which serve to bring said moving press members together with said static members to press the coils, and outer rams that subsequently engage outer parts of said moving press members to apply pressure thereto against said static press members.

10. Coil pressing apparatus according to claim 9 in which at least said moving press members are heated.

* * * * *